(12) United States Patent
Ausserlechner

(10) Patent No.: US 10,551,213 B2
(45) Date of Patent: Feb. 4, 2020

(54) SICKLE-SHAPED MAGNET ARRANGEMENT FOR ANGLE DETECTION

(71) Applicant: Infineon Technologies AG, Neubiberg (DE)

(72) Inventor: Udo Ausserlechner, Villach (AT)

(73) Assignee: Infineon Technologies AG, Neubiberg (DE)

( * ) Notice: Subject to any disclaimer, the term of this patent is extended or adjusted under 35 U.S.C. 154(b) by 188 days.

(21) Appl. No.: 15/844,073

(22) Filed: Dec. 15, 2017

(65) Prior Publication Data

US 2019/0186953 A1 Jun. 20, 2019

(51) Int. Cl.
*H01F 1/00* (2006.01)
*G01D 5/12* (2006.01)

(52) U.S. Cl.
CPC ..................... *G01D 5/12* (2013.01)

(58) Field of Classification Search
CPC ....................................................... G01D 5/12
USPC ......................................................... 335/296
See application file for complete search history.

(56) References Cited

U.S. PATENT DOCUMENTS

| | | | | |
|---|---|---|---|---|
| 4,614,930 A * | 9/1986 | Hickey | ................. | H01F 7/0278 335/302 |
| 6,791,252 B2 * | 9/2004 | Kim | ........................ | H01J 29/76 313/440 |
| 6,946,941 B2 * | 9/2005 | Chell | .................... | H01F 7/0205 335/296 |
| 8,138,873 B2 * | 3/2012 | Zhang | .................. | H01F 7/0273 335/219 |
| 2016/0216132 A1 | 7/2016 | Ausserlechner | | |

FOREIGN PATENT DOCUMENTS

DE 10 2015 104 795 9/2016

* cited by examiner

*Primary Examiner* — Alexander Talpalatski
(74) *Attorney, Agent, or Firm* — Harrity & Harrity, LLP

(57) ABSTRACT

An example includes a sickle-shaped magnet arrangement, for use in determining a rotational angle of a rotatable object and is configured to co-rotate with the rotatable object around a rotational axis, includes an inner circumferential surface having an inner radius that is based on an azimuthal coordinate of the sickle-shaped magnet arrangement, an outer circumferential surface having an outer radius that is based on the azimuthal coordinate of the sickle-shaped magnet arrangement, wherein at least the inner radius or the outer radius varies based on the azimuthal coordinate; and an axial thickness between a first end of the sickle-shaped magnet arrangement and a second end of the sickle-shaped magnet arrangement, wherein the inner circumferential surface and the outer circumferential surface form a first sickle-shaped portion and a second sickle-shaped portion, wherein the first sickle-shaped portion is diametrically opposite the second sickle-shaped portion, and wherein the first sickle-shaped portion is magnetized in a first direction and the second sickle-shaped portion is magnetized in a second direction that is within a threshold angle of the first direction and different from the first direction.

20 Claims, 8 Drawing Sheets

SICKLE-SHAPED MAGNET ARRANGEMENT FOR ANGLE DETECTION

BACKGROUND

A magnetic sensor may be capable of sensing components of a magnetic field applied to the magnetic sensor, such as a magnetic field magnitude, a magnetic field intensity, a magnetic field direction (e.g., based on directional components of the magnetic field), etc. The magnetic field of the magnet may depend on a magnetization of the magnet, a shape of the magnet, an environment of the magnet, and other factors. The magnetic sensor may be used to detect, for example, movement, position, an angle of rotation, etc., of a magnet, which may be connected to an object, in a variety of applications, such as a mechanical application, an industrial application, or a consumer application.

SUMMARY

According to some implementations, a sickle-shaped magnet arrangement, for use in determining a rotational angle of a rotatable object and is configured to co-rotate with the rotatable object around a rotational axis, may include an inner circumferential surface having an inner radius that is based on an azimuthal coordinate of the sickle-shaped magnet arrangement, an outer circumferential surface having an outer radius that is based on the azimuthal coordinate of the sickle-shaped magnet arrangement, wherein at least the inner radius or the outer radius varies based on the azimuthal coordinate; and an axial thickness between a first end of the sickle-shaped magnet arrangement and a second end of the sickle-shaped magnet arrangement, wherein the inner circumferential surface and the outer circumferential surface form a first sickle-shaped portion and a second sickle-shaped portion, wherein the first sickle-shaped portion is diametrically opposite the second sickle-shaped portion, and wherein the first sickle-shaped portion is magnetized in a first direction and the second sickle-shaped portion is magnetized in a second direction that is within a threshold angle of the first direction and different from the first direction.

According to some implementations, a rotational angle detection system may include a sickle-shaped magnet arrangement for use in determining a rotational angle of a rotatable object, the sickle-shaped magnet arrangement configured to co-rotate with the rotatable object around a rotational axis, wherein the sickle-shaped magnet arrangement may include a first sickle-shaped portion magnetized in a first direction, and a second sickle-shaped portion magnetized in a second direction that is between 120° and 180° from the first direction, wherein the first sickle-shaped portion and the second sickle-shaped portion are formed by an inner circumferential surface and an outer circumferential of the sickle-shaped magnet arrangement; and a magnetic sensor to measure the rotational angle of the rotatable object based on a magnetic field formed from the first sickle-shaped portion and the second sickle-shaped portion of the sickle-shaped magnet arrangement; wherein the magnetic sensor is positioned within a reading circle, wherein the reading circle has a reading radius corresponding to a distance between a position of the magnetic sensor and the rotational axis, and wherein an inner radius, that is smaller than the reading radius, of the inner circumferential surface is based on an azimuthal coordinate of the sickle-shaped magnet arrangement, and wherein an outer radius, that is larger than the reading radius, of the outer circumferential surface varies based on the azimuthal coordinate of the sickle-shaped magnet arrangement and the reading radius.

According to some implementations, a magnet arrangement, for use in determining a rotational angle of a rotatable object, may include a first magnet configured to co-rotate with the rotatable shaft around a rotational axis, where the first magnet may include a first inner circumferential surface having a first inner radius that varies based on an azimuthal coordinate of the magnet arrangement; a first outer circumferential surface having a first outer radius that varies based on the azimuthal coordinate of the magnet arrangement; and a first axial thickness between the first end of the magnet arrangement and the second end of the magnet arrangement, wherein the first inner circumferential surface and the first outer circumferential surface form a first sickle-shaped portion and a second sickle-shaped portion, wherein the first sickle-shaped portion is diametrically opposite the second sickle-shaped portion, wherein the first sickle-shaped portion is magnetized in a first direction and the second sickle-shaped portion is magnetized in a second direction that is within a threshold angle of the first direction and different from the first direction, and wherein a thickness of the first axial thickness is based on the azimuthal coordinate of the magnet arrangement and is proportional to a radial width of the magnet arrangement at the azimuthal coordinate, wherein the radial width at the azimuthal coordinate corresponds to a difference between a radius of the inner circumference at the azimuthal coordinate and a radius of the outer circumferential surface at the azimuthal coordinate.

DETAILED DESCRIPTION

The following detailed description of example implementations refers to the accompanying drawings. The same reference numbers in different drawings may identify the same or similar elements.

In some instances, a rotational angle detection system may use a magnet arrangement with cylindrical ring magnets (e.g., a ring magnet with a uniform thickness and a cylindrical inner radius and outer radius) to determine a rotational angle of a rotatable shaft. In such cases, the rotational angle detection system may use a plurality of magnetic sensors that are placed in a sensing plane (e.g., to form a reading circle concentric with the rotatable shaft) to measure a magnetic field generated by the magnet arrangement. Alternatively, a similar rotational angle detection system may use tapered magnets to determine a rotational angle of a rotatable shaft. The tapered magnets form a wedge in a sensor facing end of the magnet arrangement, while maintaining a planar end opposite the sensor facing end as the tapered magnets are thicker toward an outside edge of the magnet arrangement and are thinner (or infinitely thin) at an inside edge of the magnet arrangement toward the planar end. However, the cylindrical ring magnets and tapered magnets (which may be held in place via a supporting structure connected to or formed as a part of the rotatable shaft), may generate a magnetic field that, when measured by the magnetic sensors, produces measurements in an impure sine wave as the rotatable shaft rotates. Due to impurities in the sine wave, the measurements of the magnetic sensors may not allow for accurate rotational angle detection (e.g., within 1°) as the impurities in the sine wave provide a relatively high margin of error (e.g., accuracy to within 5°, within 10°, or even more).

Some implementations described herein allow for more accurate rotational angle detection (e.g., within 1°) by providing a magnet arrangement that causes a magnetic field capable of being measured in a relatively pure sine wave. The relatively pure sine wave enables rotational angle detection (e.g., via the magnetic sensors or a controller of the magnetic sensors) to within 1°.

The description herein may refer to a right-handed Cartesian coordinate system (x,y,z), where the z-axis is identical to a rotational axis of a rotatable shaft, in which an angular position of the rotatable shaft is to be determined by magnetic sensors based on sensing magnetic fields of magnets connected to or formed as part of the rotatable shaft. In some descriptions, for radial and azimuthal positions or coordinates, a radius (R) may be determined from:

$$R^2 = x^2 + y^2 \quad (1)$$

and a $\tan(\Psi) = y/x$, such that a cylindrical coordinate system $(R, \Psi, z)$, includes the z-axis being identical to the rotational axis of the rotatable shaft. In contrast to the azimuthal coordinate (or angle), $\Psi$, an angular position of the rotatable shaft is referred to as the rotational angle $\Phi$.

Figure 1A:
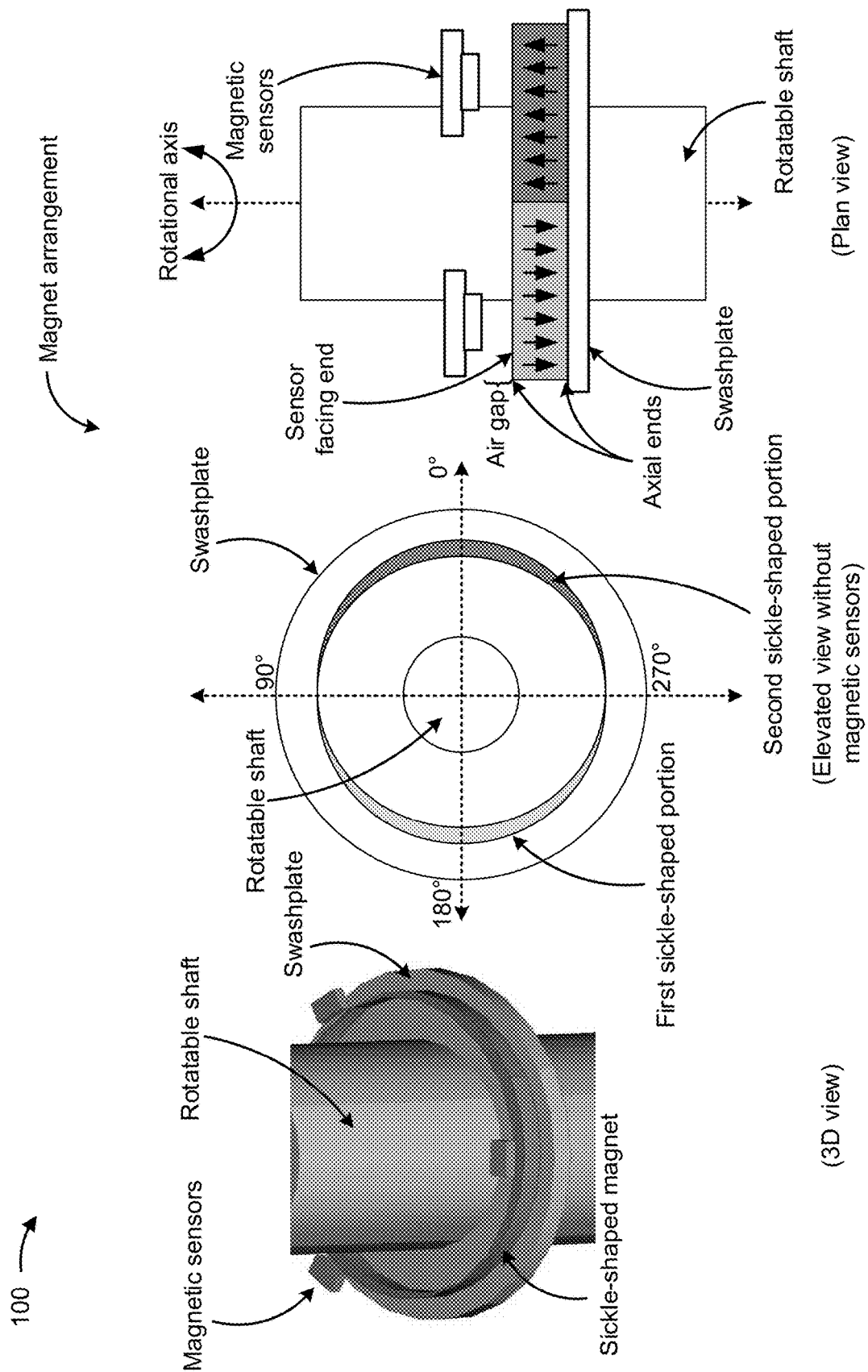
FIGS. 1A and 1B are diagrams of an overview of an example implementation described herein.
Figure 1B:
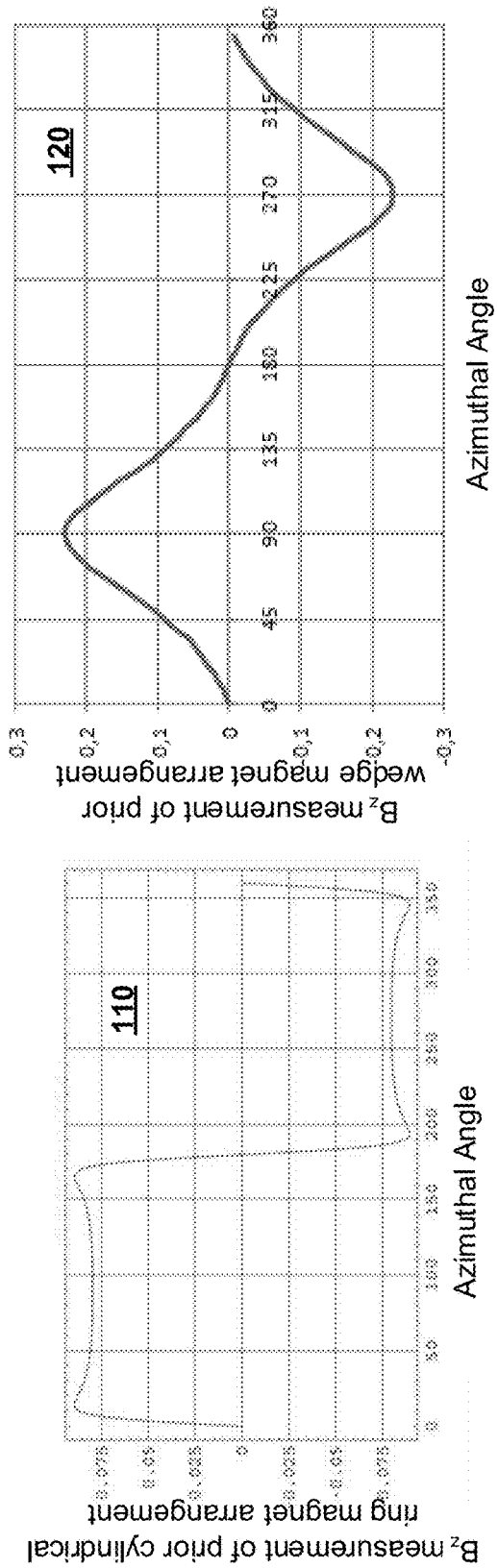

FIGS. 1A and 1B are diagrams of an overview of an example implementation 100 described herein. Example implementation 100 includes a sickle-shaped magnet arrangement for use in a rotational angle detection system that utilizes a plurality of magnetic sensors. As shown in FIG. 1A, example implementation 100 includes multiple magnetic sensors placed around a rotatable shaft. As shown, the sickle-shaped magnet arrangement may be adhered (e.g., glued, welded, clamped, and/or the like) or formed as part of a swashplate of the rotatable shaft, such that the magnet arrangement co-rotates with the rotatable shaft around a rotational axis of the rotatable shaft. In some implementations, the swashplate may be connected to (e.g., clamped, bolted, glued, press fit, and/or the like) or formed as part of the rotatable shaft. As shown in FIG. 1A, an air gap (e.g., an axial distance of approximately 0.5-3 millimeters (mm)) is between the magnetic sensors and the sickle-shaped magnet arrangement.

In FIG. 1A, example implementation 100 includes a magnet arrangement that causes the magnetic sensors to sense measurements of a magnetic field component (e.g., an axial magnetic field component $B_z$) in a sine wave that includes a relatively low amount of (if any) anomalies to enable accurate rotational angle measurement (e.g., within 1°) by a rotational angle detection system. The magnet arrangement of example implementation 100 includes a sickle-shaped magnet arrangement configured to co-rotate with a rotatable shaft. As shown in FIG. 1A, the sickle-shaped magnet is relatively ring-shaped, having a range of 0° to 360°, with a radial width that varies from relatively thicker radial widths to relatively thinner radial widths. For example, using 0° of the ring magnet of FIG. 1A as a reference point, the ring magnet is sickle-shaped in that a radial width at 0° and 180° is greater than a radial width at 90° and 270°. As shown, the radial thickness of the sickle-shaped magnet at 0° and 180° are substantially the same and the radial thickness of the sickle-shaped ring magnet arrangement at 90° and 270° are substantially the same. However, in some implementations, the radial thicknesses at 0° and 180° and/or at 90° and 270°, respectively, may be different, but within a threshold thickness (e.g., that corresponds to a manufacturing tolerance, a design tolerance, and/or the like). Furthermore, as shown in FIG. 1A, the radial width of the sickle-shaped magnet arrangement at 90° and 270° is infinitely thin. However, in some implementations, there may be a minimum radial width (e.g., 1 mm, 5 mm, and/or the like) of the sickle-shaped magnet arrangement (e.g., for increased durability) within particular azimuthal ranges of the sickle-shaped magnet arrangement.

The sickle-shaped magnet arrangement of FIG. 1A has a uniform axial thickness between axial ends of the sickle-shaped magnet. According to some implementations described herein, axial ends of the magnet arrangement may be perpendicular to the rotational axis of the rotatable shaft. In some implementations, the axial thickness may vary between the axial ends. For example, parts of the sickle-shaped magnet that have a relatively thinner radial width (or a minimum radial width) may have a relatively thinner axial thickness and parts of the sickle-shaped magnet that have a relatively thicker radial width may have a relatively thicker axial thickness (and vice versa).

As shown in FIG. 1A, the sickle-shaped magnet arrangement may include a first sickle-shaped portion (e.g., a first half of the sickle-shaped magnet arrangement, shown going counterclockwise from 90° to 270°) and a second sickle-shaped portion (e.g., a second half of the sickle-shaped ring magnet arrangement, shown going counterclockwise from 270° to 90°). According to some implementations, the first sickle-shaped portion may be diametrically symmetric to the second sickle-shaped portion, such that the first sickle-shaped portion has substantially the same dimensions (e.g., area, radial widths, radial thicknesses, and/or the like), same shape, and/or the like. In some implementations, the first sickle-shaped portion and the second sickle-shaped portion of the sickle-shaped magnet arrangement of FIG. 1A can be formed from a single piece of material, allowing for increased durability, stronger magnetic fields, decreased risk of demagnetization, and increased accuracy in determining a rotational angle of the rotatable shaft. Additionally, or alternatively, the first sickle-shaped portion and the second sickle-shaped portion of the sickle-shaped magnet arrangement of FIG. 1A can be formed from separate pieces of material and configured on the swashplate to form the sickle-shaped magnet.

The sickle-shaped magnet arrangement is magnetized to produce a magnetic field that is to be sensed by the magnetic sensors. As shown in FIG. 1A, the first sickle-shaped portion of the sickle-shaped magnet arrangement is magnetized in a first direction (shown in the plan view as downward) and parallel to the rotational axis and the second sickle-shaped portion of the sickle-shaped magnet arrangement is magnetized in a second direction (shown in the plan view as upward) that is opposite the first direction and parallel to the rotational axis. As such, the first sickle-shaped portion may be a first sickle magnet of the sickle-shaped magnet arrangement and the second sickle-shaped portion may be a second sickle magnet of the sickle-shaped magnet arrangement. In some implementations, the first sickle-shaped portion and the second sickle-shaped portion of the magnet arrangement may be magnetized such that the magnetizations are opposite or anti-parallel (e.g., 180° from one another along the rotational axis), but at a threshold angle (e.g., within 10°, 20°, and/or the like) relative to the rotational axis. In some implementations, the first sickle-shaped portion and the second sickle-shaped portion of the magnet arrangement may be magnetized such that the magnetizations are within a threshold angle (e.g., between 120° and 180°) of one another.

In some instances, the rotatable shaft and swashplate of FIG. 1A are not permanently magnetic (e.g., the rotatable shaft may be steel with permeability (μr)>100 (soft magnetic) or μr≈1 (non-magnetic)). The swashplate may include or be formed from any support structure to configure the sickle-shaped magnet arrangement to co-rotate with the rotatable shaft. In some implementations, the rotatable shaft may be soft magnetic and the swashplate may be non-magnetic to provide robustness against disturbance of the magnetic fields of the tapered magnets.

The magnetic sensors of example implementation 100 may determine a rotational angle of the rotatable shaft based on sensing components (e.g., radial, azimuthal, or axial) of the magnetic field of the sickle-shaped magnet arrangement. For example, the magnetic sensors (e.g., hall plates, magnetic field sensitive metal-oxide semiconductor field-effect transistors (MOSFETs) (MAG-FETs), Vertical Hall effect devices, or magneto-resistors (e.g., giant magneto-resistors (GMRs), tunnel magneto-resistors (TMRs), and/or anisotropic (AMRs), etc.), and/or the like) of FIG. 1A may be placed in a same sensing plane (e.g., to form a reading circle that is concentric to the rotational axis) and axially shifted from a sensor facing end of the respective sickle-shaped magnet arrangement. The magnetic sensors may be positioned within a threshold radial distance (e.g., corresponding to a radius of a concentric reading circle of the magnetic sensors in the sensing plane) from the rotational axis.

For some implementations described herein, when magnetic sensors are located at an angular position $\Psi_i=360° *i/N$ with i=0, 1, . . . , N-1 for N magnetic sensors, then a rotational angle detection system may calculate the following:

$$C+jS=\Sigma_{i=0}^{N-1}B(\Psi_i)\times e^{j\Psi_i} \qquad (2)$$

where j is representative of the imaginary unit ($\sqrt{-1}$), such that C is a real number (e.g., representative of a cosine wave component) and jS is an imaginary number (e.g., representative of a sine wave component) to create the complex number C+jS. From the complex number C+jS, the rotational angle Φ of the rotatable shaft can be determined as follows:

$$\Phi=a\tan_2(C,S) \qquad (3)$$

using a coordinate rotation digital computer (CORDIC) system calculation. Thereby, $B(\Psi_i)$ is the magnetic field measured at angular position $\Psi_i$ in the sensing plane. According to some implementations, the magnetic field B may be an axial magnetic field component $B_z$ or some other magnetic field component (e.g., radial field component, azimuthal field component, and/or the like).

As mentioned above, and shown in FIG. 1A, the sickle-shaped magnet arrangement (e.g., formed from the first sickle-shaped portion magnetized in a first direction and the second sickle-shaped portion magnetized in a second direction) may cause the magnetic sensors to make relatively pure sine wave measurements of the magnetic field of the sickle-shaped magnet arrangement, thus increasing the magnetic sensors ability to accurately determine a rotational angle (or position) of the rotatable shaft.

As shown in FIG. 1B and by graph 110, measurements of an axial magnetic field component $B_z$ from a prior cylindrical ring magnet arrangement (e.g., a cylindrical ring magnet arrangement) form a relatively square-shaped wave where zero transitions are relatively steep and maxima are relatively broad. As further shown in FIG. 1B and by graph 120, measurements of an axial magnetic field component $B_z$ from a prior wedge magnet arrangement (e.g., that includes tapered magnets) form a sine wave that includes anomalies. Using these measurements from the waves of graphs 110 and 120, a rotational angle detection system may not accurately detect the rotational angle (e.g., with an accuracy within 1°) of the magnet arrangement (and thus the rotatable shaft). Specifically, a rotational angle detection system that computes C+jS to derive the rotational angle may inaccurately calculate the rotational angle from C+jS due to the square shape of the square-shaped wave measurements and/or the anomalies in the sine wave measurements of the axial magnetic field component $B_z$ of the magnetic field caused by the prior ring magnet arrangement and prior wedge magnet arrangement, respectively.

More specifically, with respect to the measurements of the prior wedge magnet arrangement in graph 120, the sensed measurements of a magnetic field of the prior wedge magnet arrangement may be in a wave form that has a third harmonic that is roughly 10 percent of a fundamental frequency as follows:

$$B_z/B_{rem}=\sin(\Phi)+0.1\times\sin(3\Phi) \qquad (4)$$

resulting in a relatively large margin of error (accuracy may be within 5-10°) when estimating a rotational angle of the magnet arrangement (and, thus, the rotatable shaft). Some implementations described herein address this by providing the sickle-shaped magnet arrangement of example implementation 100 that includes a first sickle-shaped portion magnetized in a first direction and a second sickle-shaped portion magnetized in a second direction.

As shown by graph 130 in FIG. 1B, the sickle-shape of the first sickle-shaped portion and the second sickle-shaped portion of the sickle-shaped magnet arrangement of example implementation 100 reduces a relatively high harmonic content of the axial magnetic field component $B_z$. For example, by providing varying radial thickness within certain azimuthal ranges of the prior ring magnet arrangement or by avoiding infinitely thin wedge ends of prior tapered magnets of a prior magnet arrangement, a sickle-shaped magnet arrangement may generate a magnetic field that is capable of being measured in a pure sine wave as the sickle-shaped magnet arrangement rotates (e.g., with a rotatable shaft).

As further shown in FIG. 1B by graph 140, a thickness of the airgap (denoted by AG in the legend of the plot) does not affect the sinusoidal purity of the measurements of the magnetic field generated by the sickle-shaped magnet arrangement. According to the graph 140 of FIG. 1B, the smaller the air gap is, the greater the magnitude of the axial magnetic field component $B_z$ from the sickle-shaped magnet arrangement. For example, as shown, the maxima of the measurement of the axial magnetic field component $B_z$, with a 1 mm air gap is approximately 0.15, the maxima of the measurement of the axial magnetic field component $B_z$, with a 2 mm air gap is approximately 0.07, and the maxima of the measurement of the axial magnetic field component $B_z$, with a 3 mm air gap is approximately 0.05. As such, narrowing the air gap may decrease rotational angle detection errors as the magnetic sensors can more accurately determine a rotational position of the rotatable shaft using the sine wave with the greater maxima. Additionally, or alternatively, in a similar manner, in some implementations, increasing an axial thickness of the sickle-shaped-magnet arrangement may decrease rotational angle detection errors as the sickle-shaped magnet arrangement with a relatively thicker axial thickness generates a stronger magnetic field.

In some implementations, as further described herein, the sickle-shaped magnet arrangement of example implementation 100 may be one of a plurality of sickle-shaped magnet arrangements. For example, in such cases, the plurality of sickle-shaped magnet arrangements, may be comprised of multiple pairs of sickle-shaped portions that are arranged on a swashplate. The multiple sickle-shaped magnet arrangements may be concentric to one another and/or aligned according to direction of magnitude of portions of the sickle-shaped magnet arrangement and/or thicknesses of the radial widths.

Accordingly, a sickle-shaped magnet arrangement is provided herein to cause magnetic sensors, separated by an axial air gap from the sickle-shaped magnet arrangement, to measure a sinusoidal magnetic field component of the magnet arrangement to enable increased accuracy (e.g., within 1°) in measuring a rotational angle of a rotatable shaft, relative to prior magnet arrangements. Furthermore, in some implementations, the magnet arrangement may be efficiently manufactured to conserve manufacturing resources and/or be more mechanically stable than prior magnet arrangements.

As indicated above, FIGS. 1A and 1B are provided merely as examples. Other examples are possible and may differ from what was described with regard to FIGS. 1A and 1B.

Figure 2A:
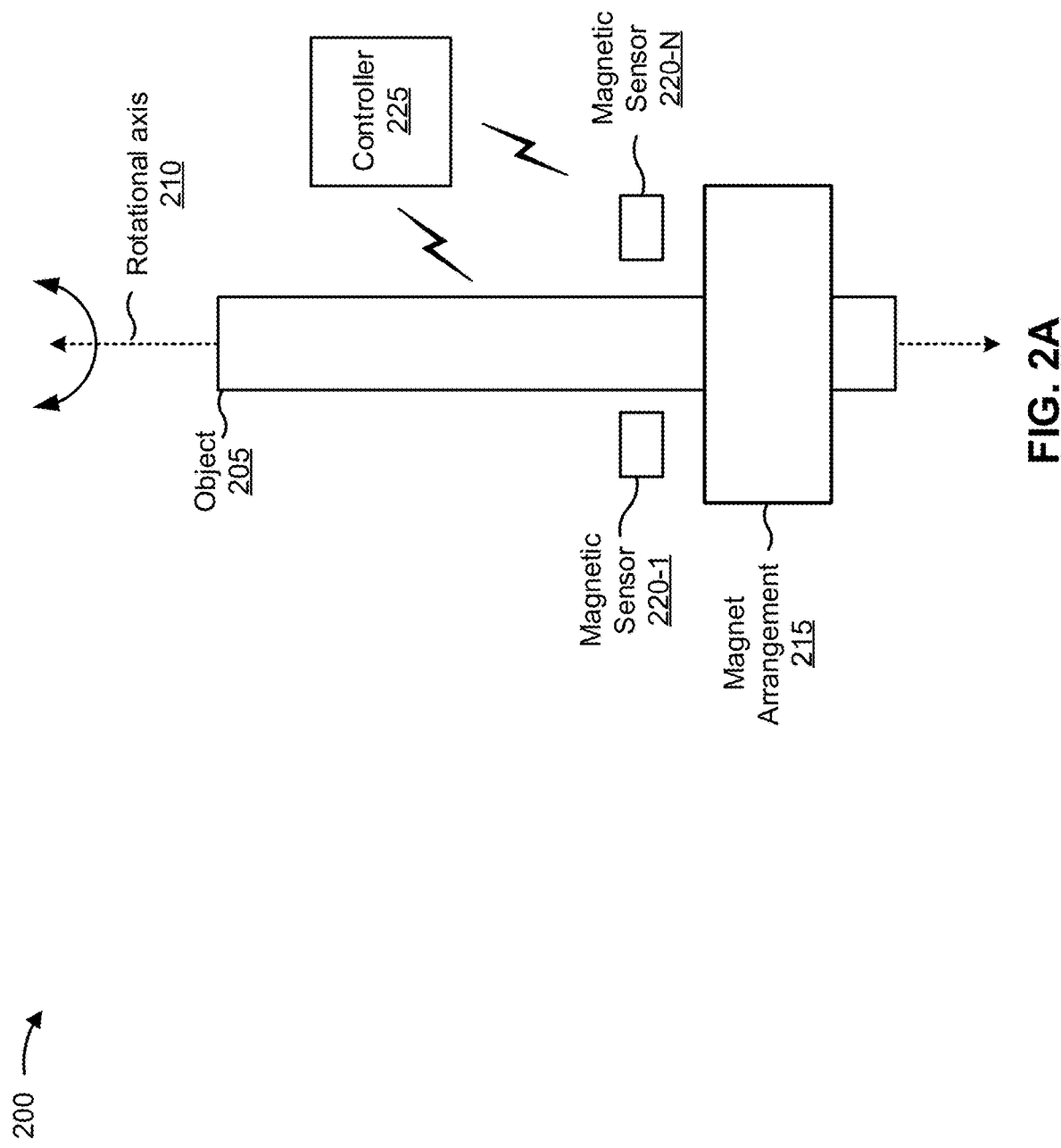
FIGS. 2A and 2B are diagrams of an example environment in which magnet arrangements, systems, and/or methods, described herein, may be implemented.

FIG. 2A is a diagram of an example environment 200 in which magnet arrangements, systems, and/or methods, described herein, may be implemented. As shown in FIG. 2A, environment 200 may include an object 205 (which corresponds to the rotatable shaft of FIG. 1A) that may be positioned with respect to rotational axis 210 (which may be referred to herein as a "z-axis"), a magnet arrangement 215 (which may correspond to the magnet or magnet arrangement of FIG. 1A) connected to or formed as a part of object 205, magnetic sensors 220-1 to 220-N (N≥1) (which may correspond to the magnetic sensors of FIG. 1A and are hereinafter referred to collectively as "magnetic sensors 220," and individually as "magnetic sensor 220"), and a controller 225.

Object 205 is an object for which a rotational angle, a position, and/or the like is of interest for a given application. For example, object 205 may be a part of a mechanical system of a machine (e.g., a vehicle, a manufacturing machine, an industrial machine, an agricultural machine, and/or the like). In some implementations, object 205 is capable of rotating about rotational axis 210. In some implementations, object 205 is cylindrical. In such implementations, the radius of object 205 may be approximately 10 mm.

In some implementations, object 205 is mechanically connected to (e.g., attached to, coupled with, affixed to, embedded in, formed as a part of, and/or the like) magnet arrangement 215. For example, object 205 may include a support structure (e.g., a swashplate) that causes magnet arrangement 215 to co-rotate with object 205. Example object 205 may be mostly steel (e.g., a material with permeability (μr)>100, a martensitic stainless steel, a mild steel, and/or the like) and/or a non-magnetic material (e.g., 0.9<μr<1.5, such as aluminum, brass, bronze, copper, plastic, austenitic stainless steel, and/or the like).

Magnet arrangement 215 includes one or more magnets that are configured to co-rotate with object 205 such that a rotation of magnet arrangement 215 corresponds to a rotational angle (or rotational position) of object 205, as described herein. Magnet arrangement 215 may be a sickle-shaped magnet arrangement and object 205 may be a cylinder. In some implementations, magnet arrangement 215 may be sickle-shaped in that the magnet arrangement includes one or more sickle-shaped portions or one or more sickle-shaped magnets. In some implementations, magnet arrangement 215 may be formed from one or more pairs of sickle-shaped portions and/or one or more pairs of sickle-shaped magnets that are diametrically symmetrical (e.g., geometrically). For example, a pair of sickle-shaped portions may be diametrically opposite one another, such that one sickle-shaped portion is mirror-symmetric to the other sickle-shaped portion of the pair. In such cases, a mirror plane, which may contain rotational axis 210, may be an intersection between the sickle-shaped portions. As such, an intersection (which may be referred to as a sickle intersection) may be formed between sickle-shaped portions of the sickle-shaped magnet arrangement.

Magnet arrangement 215 may include a sickle-shaped portion or a sickle-shaped magnet that has an inner radius, $R_i$, and an outer radius, $R_o$, based on azimuthal coordinate, $\Psi$, that is defined according to:

$$R_i(\Psi) = \frac{RR^2}{R_o(\Psi)} \quad (5)$$

where RR is a reading radius (e.g., of a reading circle of magnetic sensors) corresponding to a radial distance between magnetic sensors 220 and rotational axis 210. In some implementations, RR may be equal to a center radius of magnet arrangement 215. The center radius of magnet arrangement 215 may be equal to an average of the inner radius and the outer radius of the magnet arrangement at a particular azimuthal coordinate. According to some implementations, for all azimuthal coordinates, an outer radius of magnet arrangement 215 is larger than the center radius and the inner radius is smaller than the center radius. As such, when the center radius corresponds to a reading radius of magnetic sensors 220, an outer circumferential surface (defined by the outer radius) of magnet arrangement 215 may be outside or aligned with the reading radius of magnetic sensors 220 as magnet arrangement 215 rotates. Furthermore, in such cases, an inner circumferential surface (defined by the inner radius) of magnet arrangement 215 may be inside or aligned with the reading radius of magnetic sensors 220 as magnet arrangement 215 rotates.

Accordingly, a length of the inner radius and/or outer radius at a particular point of magnet arrangement 215 may vary based on the azimuthal coordinate of that particular point of magnet arrangement and the length of the center radius and/or reading radius. In some implementations, an axial thickness of magnet arrangement 215 may be based on the inner radius and the outer radius of magnet arrangement 215. For example, the axial thickness may be proportional to the inner radius, the outer radius, an average of the inner radius and the outer radius (e.g., which may be the same as the reading radius), and/or a different of the inner radius and the outer radius (e.g., which may be the radial width). In some implementations, the axial thickness may be proportional to the radial width (which may be equal to the difference between the outer radius and the inner radius) of magnet arrangement 215 at a particular azimuthal coordinate. In some implementations, as the radial width varies monotonously between a smallest width and a largest radial width, the axial thickness may correspondingly vary monotonously between a smallest thickness and largest axial thickness.

In some implementations, a dimension of magnet arrangement 215 (e.g., a length, a width, a height, a diameter, a radius, and/or the like) may be in a range from approximately 1 millimeter (mm) to approximately 25 mm. As a particular example, magnet arrangement 215 may have a thickness or height of approximately 2 mm, an inner radius of approximately 21.5 mm-1 mm*abs(sin($\Psi$)) and an outer radius of approximately 21.5 mm+1 mm*abs(sin($\Psi$)). As such, the radial width of the sickle-shaped portions of the magnet arrangement 215 have maximum width of 2 mm and an infinitely thin minimal width, as the width approaches 0 mm (unless a threshold minimum width (e.g., 0.1 mm, 0.5 mm, and/or the like) is used).

In some implementations, sickle-shaped portions of magnet arrangement may include p equal pole pairs in order to produce an axial magnetic field component $B_z(\Psi)$ measurement wave that has one period for 0°<$\Psi$<360°. As such, p equal pole pairs may be included within magnet arrangement 215 in order to produce $B_z(\Psi)$ measurement wave with periods of 360°/p. For example, for 3 equal pole pairs, a $B_z(\Psi)$ measurement wave may have 3 sinusoidal periods within one revolution of the magnet arrangement 215. In such instances, magnet arrangement 215 may have an inner radius of $R_i$=21.5 mm-2 mm*abs(sin(3*$\Psi$)−0.05*sin(5*$\Psi$)) and an outer radius of $R_o$=(21.5 mm)$^2$/$R_i$. Accordingly, sin($\Psi$) is to be infinitely small and/or much smaller than the sin (3*$\Psi$) (e.g., at least 10 times smaller). In some implementations, the inner radius, $R_i$, and outer radius, $R_o$, of one or more sickle-shaped portions or sickle-shaped magnets of magnet arrangement 215 may be expressed as a Fourier Series relative to azimuthal angle $\Psi$.

In some implementations, magnet arrangement 215 may include an inner radius that is constant and an outer radius that varies based on an azimuthal coordinate of magnet arrangement 215 or an outer radius that is constant and an inner radius that is based on an azimuthal coordinate of magnet arrangement 215.

In some implementations an inner circumferential surface and an outer circumferential surface of magnet arrangement 215 may be elliptic cylindrical (e.g., an inner circumference corresponding to the inner radius and outer circumference corresponding to the outer radius are elliptical), causing magnet arrangement 215 to include sickle-shaped portions and/or sickle-shaped magnets. For example, the major axis of an elliptic cylindrical inner circumferential surface of magnet arrangement 215 may be perpendicular to a minor axis of an elliptic cylindrical outer circumferential surface of magnet arrangement 215 (and vice versa).

Figure 2B:
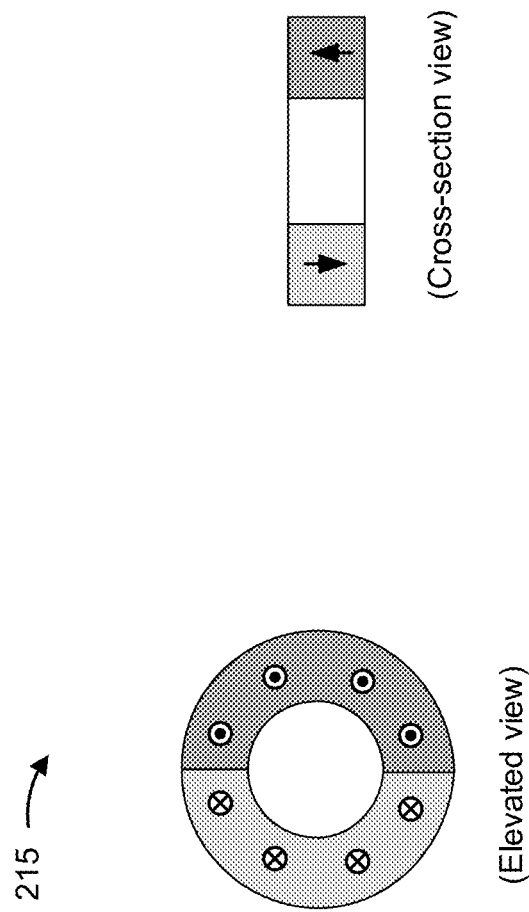

In some implementations, as shown in FIG. 2B, magnet arrangement 215 may include a single piece of material comprised of a pair of magnets that are magnetized in opposite or anti-parallel directions (e.g., the magnetizations are 180° from one another relative to the radial and azimuthal coordinates of the environment). In some implementations, the magnetizations of the pair of magnets is parallel (e.g., parallel (within a tolerance)) to rotational axis 210. In some implementations, the magnetizations are in opposite directions but at an angle relative to the rotational axis. In some implementations, the magnetizations are not anti-parallel (e.g., 180° from one another along the rotational axis), but a threshold angle (e.g., an angle between 120° and 180°) between the magnetizations is present (e.g., based on a design of magnet arrangement 215).

As shown in FIG. 2B, magnet arrangement 215 includes a first half magnetized in a first direction and a second half magnetized in a second direction, such that magnet arrangement 215 comprises a pair of magnets that are diametrically opposite one another in the magnet arrangement. Additionally, or alternatively, magnet arrangement 215 may include a multi-pole magnet (e.g., a dipole magnet, a 3 pole-pair magnet, etc.), a permanent magnet, an electromagnet, a magnetic tape, an axially magnetized magnet, and/or the like.

In some implementations, magnet arrangement 215 may be comprised of a ferromagnetic material (e.g., Hard Ferrite) and/or a compound (e.g., rubber) that includes ferromagnetic material. As such, magnet arrangement 215 may produce a magnetic field. In some implementations, magnet arrangement 215 may be formed or configured from a single piece of material and magnetized to produce a magnetic field (e.g., magnetized to include one or more directions of magnetization). In some implementations, magnet arrangement 215 may further comprise a rare earth magnet, which may be of advantage due to an intrinsically high magnetic field strength of rare earth magnets.

In some implementations, magnet arrangement 215 may be connected to object 205 in an asymmetric manner. For example, a center axis of magnet arrangement 215 may not align with rotational axis 210. Although magnet arrangement 215 is shown with sharp edges/corners, edges and/or corners of magnet arrangement 215 may be rounded.

Returning to FIG. 2A, magnetic sensors 220 include one or more apparatuses for sensing one or more components of a magnetic field of magnet arrangement 215 for use in determining a rotational angle (and/or position) of object 205 (e.g., based on a position of magnet arrangement 215 relative to magnetic sensor 220). For example, magnetic sensors 220 may include one or more circuits (e.g., one or more integrated circuits) that operate to sense a set of components (e.g., a z-component, a radial component, and a tangential component) of the magnetic field produced by magnet arrangement 215. According to some implementations, a set of components may include one or more of an intensity of a magnetic field (e.g., a magnetic flux density and/or a magnetic field strength), a magnetic field magnitude, a magnetic field direction, and/or the like.

Magnetic sensors 220 may be three dimensional (3D) magnetic sensors capable of sensing three directional components of a magnetic field (e.g., a radial component, an azimuthal (tangential) component, and an axial component). In some implementations, magnetic sensors 220 may include respective integrated circuits that include integrated controller 225 and/or a plurality of integrated controllers 225 (e.g., such that an output of magnetic sensors 220 may include information that describes a position of magnet arrangement 215 and/or a position of object 205). In some implementations, magnetic sensors 220 may include one or more sensing elements to sense the set of components of the magnetic field produced by magnet arrangement 215. For example, the sensing element may include a Hall-based sensing element that operates based on a Hall-effect. As another example, the sensing element may include a magneto-resistive based (MR-based) sensing element, elements of which are comprised of a magneto-resistive material (e.g., nickel-iron (NiFe)), where the electrical resistance of the magneto-resistive material may depend on a strength and/or a direction of the magnetic field present at the magneto-resistive material. Here, a sensing element may operate based on an AMR effect, a GMR effect, a TMR effect, and/or the like. As an additional example, a sensing element of one or more of magnetic sensors 220 may include a variable reluctance (VR) based sensing element that operates based on induction. In some implementations, magnetic sensors 220 may include an analog-to-digital converter (ADC) to convert an analog signal received from the sensing elements into digital signals to be processed (e.g., by a digital signal processor (DSP)) by magnetic sensor 220.

In some implementations, magnetic sensors 220 may be arranged in positions relative to magnet arrangement 215 such that magnetic sensors 220 may detect components of a magnetic field produced by magnet arrangement 215. For example, as shown in FIG. 2A, magnetic sensor 220 may be arranged such that magnetic sensors 220 are a particular distance from magnet arrangement 215, such that an air gap (e.g., approximately 1.0 mm to 5.0 mm air gap) may be present between magnetic sensors 220 and magnet arrangement 215 when magnet arrangement 215 rotates about rotational axis 210. In some implementations, magnetic sensors 220 may be situated in a sensing plane (or a reading circle) that is an axial distance (e.g., corresponding to the air gap) from a sensor facing end of magnet arrangement 215. In some implementations, if there are two magnetic sensors, the magnetic sensors may be placed at 0° and 90° (where 0° is an arbitrary position of rotation). Further, if three magnetic sensors are to be used, the magnetic sensors may be placed at 0°, 120°, and 240°; if four magnetic sensors are to be used, the magnetic sensors may be placed at 0°, 90°, 180°, and 270°; if five magnetic sensors are to be used, the magnetic sensors may be placed at 0°, 72°, 144°, 216°, 288°, and so on.

In some implementations, magnetic sensors 220 may be configured with mapping information associated with determining a rotational angle of object 205 based on a sensed magnetic field (or a sensed set of components of the magnetic field). Magnetic sensor 220 may store the mapping information in a memory element (e.g., a read only memory (ROM) (e.g., an electrically erasable programmable read-only memory (EEPROM)), a random access memory (RAM), and/or another type of dynamic or static storage device (e.g., a flash memory, a magnetic memory, an optical memory, etc.)) of magnetic sensors 220. The mapping information may include information associated with a rotational angle and a set of components of the magnetic field corresponding to the rotational angle. The mapping information may include such information for multiple rotational angles and/or positions of object 205. In some implementations, magnetic sensors 220 may be configured with the mapping information during a manufacturing process associated with magnetic sensors 220 and/or a rotational angle detection system, a calibration process associated with magnetic sensors 220, a setup process associated with magnetic sensors 220, and/or the like.

During operation, magnetic sensors 220 may sense the set of components of the magnetic field of magnet arrangement 215. Magnetic sensors 220 may then compare the sensed set of components of the magnetic field to the mapping information, and determine the rotational angle of object 205 based on the comparison. For example, magnetic sensors 220 may identify sets of components of the magnetic field, included in the mapping information, that match (e.g., within a threshold or that satisfy a matching threshold) the sensed set of components of the magnetic field (e.g., an amplitude of a radial component of the magnetic field, an amplitude of a tangential component of the magnetic field, or an amplitude of an axial component of the magnetic field). In this example, magnetic sensors 220 may determine the rotational angle of object 205 as the rotational angle corresponding to the matched mapping information.

Controller 225 includes one or more circuits associated with determining a rotational angle (and/or position) of object 205, and providing information associated with the rotational angle of object 205. For example, controller 225 may include one or more of an integrated circuit, a control circuit, a feedback circuit, and/or the like. Controller 225 may receive input signals from one or more magnetic sensors (e.g., from a digital signal processor (DSP) of magnetic sensor 220), such as one or more magnetic sensors 220, may process the input signals (e.g., using an analog signal processor, a digital signal processor, etc.) to generate an output signal, and may provide the output signal to one or more other devices or systems. For example, controller 225 may receive one or more input signals from magnetic sensor 220, and may use the one or more input signals to generate an output signal comprising the rotational angle (or position) of object 205, to which magnet arrangement 215 is connected.

The number and arrangement of apparatuses shown in FIGS. 2A and 2B are provided as examples. In practice, there may be additional apparatuses, fewer apparatuses, different apparatuses, or differently arranged apparatuses than those shown in FIGS. 2A and 2B. Furthermore, two or more apparatuses shown in FIGS. 2A and 2B may be implemented within a single apparatus, or a single apparatus shown in FIGS. 2A and 2B may be implemented as multiple, distributed apparatuses. Additionally, or alternatively, a set of apparatuses (e.g., one or more apparatuses) of environment 200 may perform one or more functions described as being performed by another set of apparatuses of environment 200.

Figure 3:
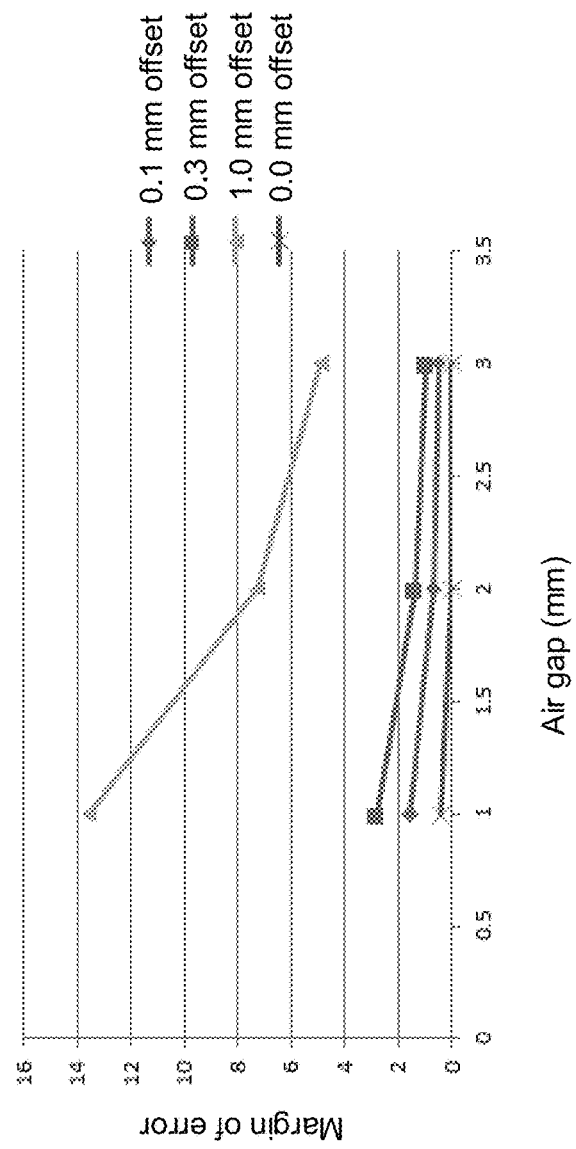
FIGS. 3-6 are diagrams associated with example implementations of magnet arrangements described herein.

FIG. 3 is a diagram associated with an example implementation of magnet arrangements described herein. FIG. 3 includes example graph 300 of characteristics of a sickle-shaped magnet arrangement described herein. In some implementations, magnetic sensors may shift relative to the rotational axis, thus offsetting the reading circle of magnetic sensors (such that a center of the reading circle is not aligned with the rotational axis). For example, a component board (e.g., a printed circuit board (PCB)) holding the magnetic sensors may move toward or away from the rotational axis (e.g., due to wear of a machine of the rotational angle detection system, and/or the like). The graph 300 shows a margin of error based on an air gap between magnetic sensors and the sickle-shaped magnet arrangement and an offset that occurs between a reading circle of magnetic sensors and the rotational axis.

The graph 300 in FIG. 3 shows that the margin of error, regardless of the length of the offset, relatively decreases as the air gap increases (e.g., because the shift of the reading circle is proportionally less relative to the air gap). As show by the graph 300, when there is no offset, the margin of error is within 1° (at most); when there is a 0.1 mm offset, the margin of error is within approximately 2° (at most); when there is a 0.3 mm offset, the margin of error is within approximately 3°; and when there is a 1.0 mm offset, the margin of error is within 14°. The increased margin of error due to the offsets may be caused by relatively thin (or infinitely thin) radial widths of ends of sickle-shaped portions of the sickle-shaped magnet arrangement.

Accordingly, an offset between the reading circle of magnetic sensors and the rotational axis can cause issues with providing accurate angle detection (e.g., within 1°). Therefore, to address these issues, in some implementations, as described herein, a plurality of sickle-shaped magnet arrangements may be included in a rotational angle detection system (e.g., see FIG. 4).

As indicated above, FIG. 3 is provided merely as an example. Other examples are possible and may differ from what was described with regard to FIG. 3.

Figure 4:
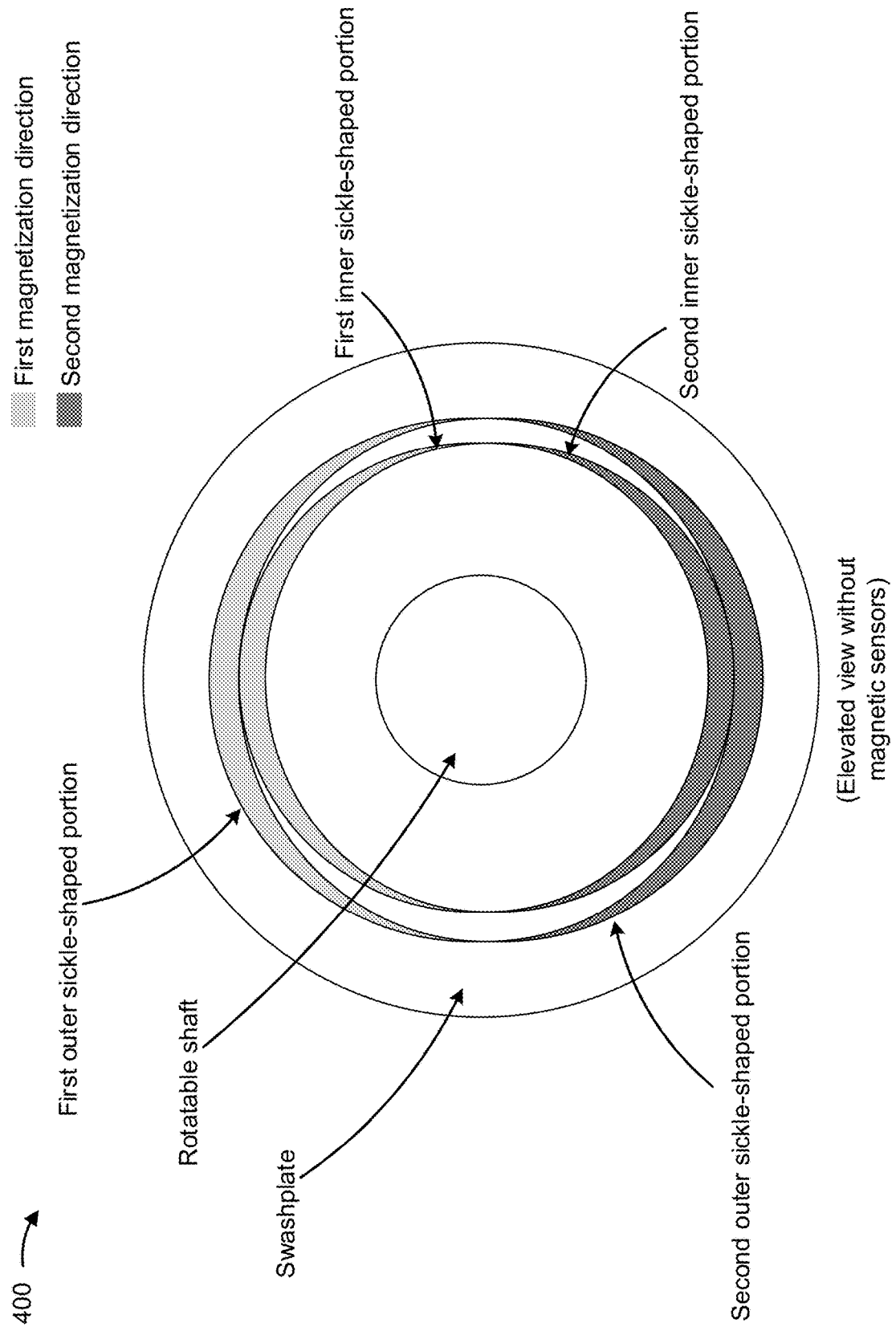

FIG. 4 is a diagram associated with an example implementation 400 of a sickle-shaped magnet arrangement as described herein. Example implementation 400, as shown in FIG. 4, includes a sickle-shaped magnet arrangement with multiple pairs of sickle-shaped portions (or multiple pairs of sickle-shaped magnets). The sickle-shaped magnet arrangement of example implementation 400 includes an inner pair of sickle-shaped portions and an outer pair of sickle-shaped portions connected to or formed as part of a same swashplate (which may be connected to or formed as part of a rotatable shaft).

As shown in FIG. 4, the inner pair of sickle-shaped portions and the outer pair of sickle-shaped portions in the sickle-shaped magnet arrangement of example implementation 400 are concentric to one another. For example, dimensions of the inner pair of sickle-shaped portions may be scaled from dimensions of the outer pair of sickle-shaped portions (and vice versa). As such, in example implementation 400, the outer pair of sickle-shaped portions have larger inner radial dimensions than outer radial dimensions of the inner pair of sickle-shaped portions corresponding to the azimuthal coordinates of the sickle-shaped magnet arrangement.

In some implementations, an outer radius of an outer circumferential surface of the inner sickle-shaped portions may be equal to (or near equal to) an inner radius of an inner circumferential surface of the outer sickle-shaped portions at two diametrically opposite locations, such that the inner sickle-shaped portions and the outer sickle-shaped portions are touching (as shown in FIG. 4). In some implementations, a small space (e.g., 1 mm or less, as small as a manufacturing tolerance may allow, and/or the like) may be present between the outer circumferential surface of the inner sickle-shaped portions and the inner circumferential surface of the outer sickle-shaped portions. In such cases, the space may allow for manufacturability of the sickle-shaped magnet arrangement and increase an allowed lateral shift (offset) of the reading circle (e.g., due to movement of a substrate holding the magnetic sensors in the reading circle).

Furthermore, the inner pair of sickle-shaped portions may be aligned with the outer pair of sickle-shaped portions such that the thickest inner radial widths of the inner pair of sickle-shaped magnets align with the thickest radial widths of the outer pair of sickle-shaped magnets and/or that the thinnest inner radial widths of the inner pair of sickle-shaped magnets align with the thinnest radial widths of the outer pair of sickle-shaped portions. In some implementations, the inner pair of sickle-shaped magnets may touch the outer pair of sickle-shaped portions (e.g., at locations where the radial widths of the inner sickle-shaped portions and the outer sickle-shaped portions are thickest). In some implementations, a radial distance may be between the inner pair of sickle-shaped portions and the outer pair of sickle-shaped portions.

Furthermore, as shown in FIG. 4, a first inner sickle-shaped portion and a first outer sickle-shaped portion have a first magnetization direction and a second inner sickle-shaped portion and a second outer sickle-shaped portion have a second magnetization direction (e.g., that is different from the first magnetization direction). In example implementation 400, the inner pair of sickle-shaped portions are aligned with the outer pair of sickle-shaped portions according to the directions of magnetization. For example, as shown, the first inner sickle-shaped portion and the first outer sickle-shaped portion having the same first magnetization direction are substantially aligned to be adjacent one another, and the second inner sickle-shaped portion and the second outer sickle-shaped portion having the same second magnetization direction are substantially aligned to be adjacent to one another. In some implementations, the inner pair of sickle-shaped portions may be offset (e.g., according to a design) to the outer pair of sickle-shaped portions such that the first inner sickle-shaped magnet is not aligned with the first outer sickle-shaped portion or the second inner sickle-shaped portion is not aligned with the second outer sickle-shaped portion.

In the sickle-shaped magnet arrangement of example implementation 400, a reading circle of magnetic sensors may be situated between the inner pair of sickle-shaped portions and the outer pair of sickle-shaped portions. According to some implementations, the multiple pairs of sickle-shaped portions of the magnet arrangement of example implementation 400 may generate a magnetic field that enables magnetic sensors (which may be programmed based on the magnet arrangement of example implementation 400) to sense an axial component of the magnetic field in a pure, or near pure, sine wave as the magnet arrangement (and thus the rotatable shaft) rotates. Furthermore, the multiple pairs of sickle-shaped portions of the magnet arrangement of example implementation 400 may lessen a margin of error of detecting a rotation angle of the rotatable shaft that may be caused by an offset between a reading circle and the rotational axis of the rotatable shaft. For example, the increased number of pairs of sickle-shaped portions may increase a strength of the magnetic field, thus lessening the effects of the offset. As such, the magnetic sensors may more accurately determine a position of the magnet arrangement (and thus the rotatable shaft) versus prior magnet arrangements, as fewer anomalies are present in the measured sine wave of the axial component of the magnetic field relative to the prior magnet arrangements.

As indicated above, FIG. 4 is provided merely as an example. Other examples are possible and may differ from what was described with regard to FIG. 4.

Figure 5:
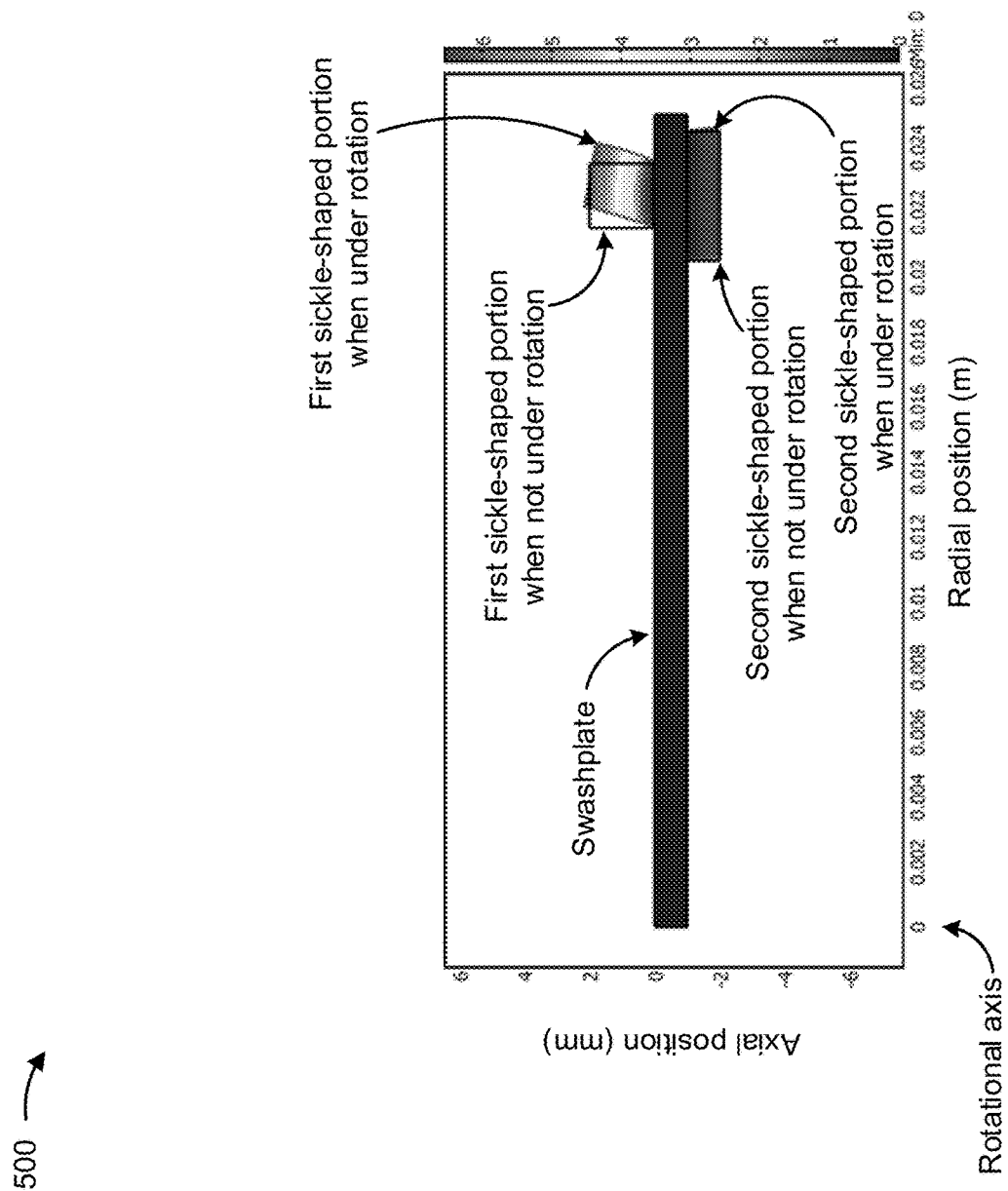

FIG. 5 is a diagram associated with an example implementation of a magnet arrangement described herein. FIG. 5 includes an image 500 of cross-sections of portions of sickle-shaped portions (which may be included in sickle-shaped magnet arrangements described herein) that are under rotation. In the image 500 of FIG. 5, to show differences in distortion of shapes of a first sickle-shaped portion and a second sickle-shaped portion when under rotation, the first sickle-shaped magnet portion, having a square-shaped cross-section with a relatively thick axial thickness and a relatively thin radial thickness, is situated on top of a swashplate, and the second sickle-shaped magnet portion, having a rectangular cross-section with relatively thin axial thickness and a relatively thick radial thickness, is situated on the bottom of the swashplate. In some aspects, the aspect ratio of the first sickle-shaped magnet portion is 1 (i.e., square), whereas the aspect ratio of the second sickle-shaped magnet portion is approximately 4.

The first sickle-shaped magnet and the second sickle-shaped magnet may be comprised of a soft rubber compound with ferrite powder. As shown, the first sickle-shaped magnet, when under rotation, due to the characteristics of the material and the relatively thin radial width and thick axial thickness may distort outward (away from the rotational axis) from an original position of the first sickle-shaped magnet when the first sickle-shaped magnet is not under rotation. On the other hand, the second sickle-shaped magnet, when under rotation, has relatively minimal distortion from the original position of the second sickle-shaped magnet when the second sickle-shaped magnet is not under rotation.

As such, in some implementations, to ensure stability under rotation and prevent distortion of a sickle-shaped magnet arrangement formed from a compound (e.g., rubber) that includes ferromagnetic material, it may be advantageous to have dimensions of the sickle-shaped magnet that include rectangular cross sections with a minimum threshold aspect ratio (e.g., 3, 4, 10, and/or the like). Accordingly, an axial thickness of parts of a sickle-shaped magnet may be a threshold fraction (corresponding to the aspect ratio) of a radial thickness of the corresponding parts of the sickle-shaped magnet arrangement.

As indicated above, FIG. 5 is provided merely as an example. Other examples are possible and may differ from what was described with regard to FIG. 5.

Figure 6:
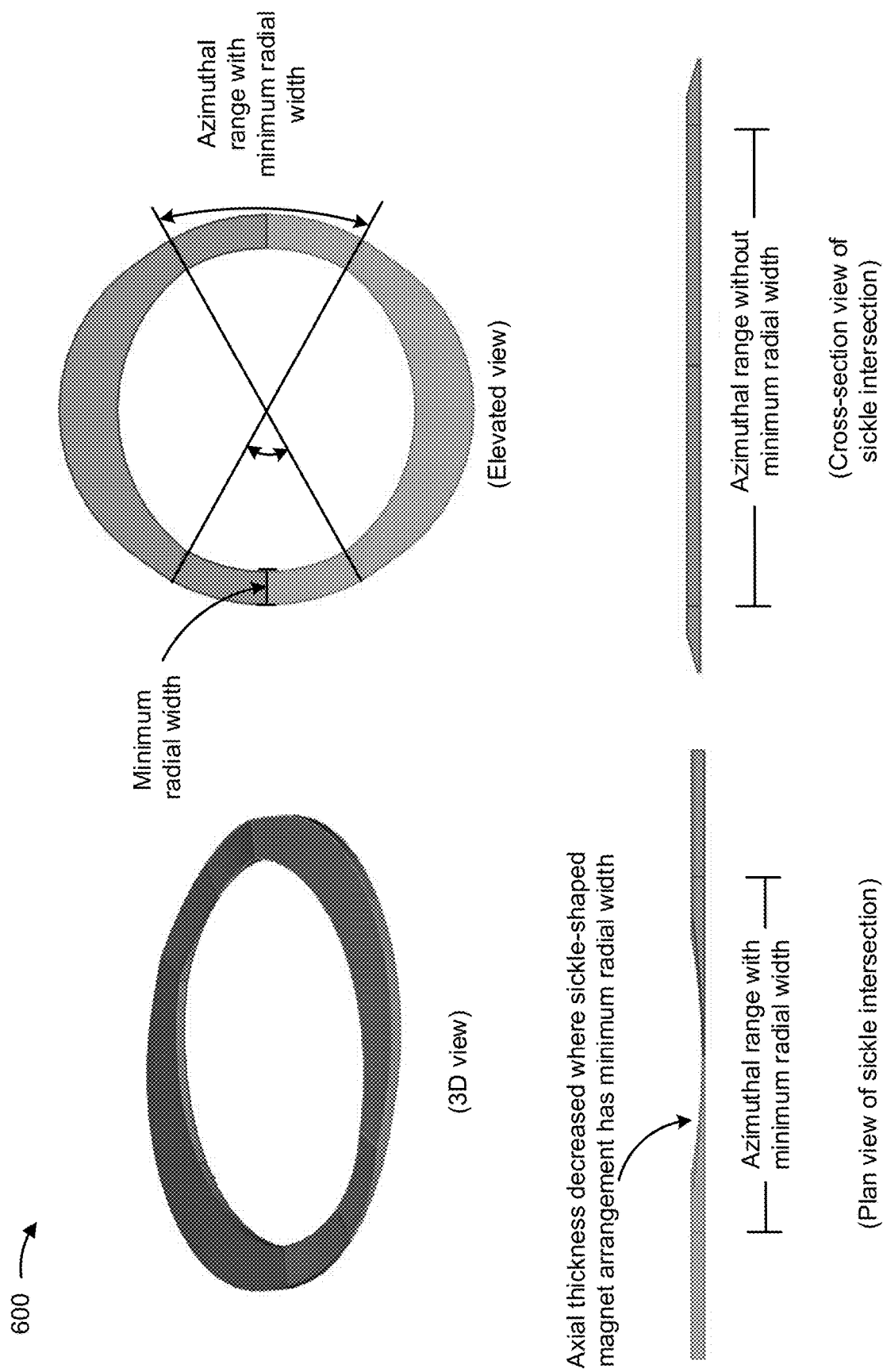

FIG. 6 includes diagrams associated with an example implementation 600 of a sickle-shaped magnet arrangement described herein. In some implementations, due to the sickle-shape of portions in sickle-shaped magnet arrangements described herein, parts of sickle-shaped portions that have a relatively thinner radial width generate a magnetic field that is lower strength than the parts of the sickle-shaped portions that have relatively thicker radial width. However, having a relatively thinner radial width (or an infinitely thin radial width) may compromise a structural integrity of the sickle-shaped magnet arrangement at parts of the sickle-shaped magnet arrangement with relatively thinner radial widths. As such, the sickle-shaped magnet arrangement of example implementation 600 is configured to address this issue by providing a minimum radial width for parts (e.g., corresponding to azimuthal ranges of sickle shaped portions) of the sickle-shaped magnet arrangement and decreasing an axial thickness of the sickle-shaped magnet arrangement at parts of the sickle-shaped magnet arrangement that have the minimum radial width.

As shown by the example implementation 600 of FIG. 6, the sickle-shaped magnet arrangement is configured to have a minimum radial width. For example, the sickle-shaped magnet arrangement may have a minimum radial width at parts of the sickle-shaped portions where a radial width calculated from a distance between radii using Equation 5 would be shorter than the minimum radial width. Therefore, within a particular angular range of azimuthal coordinate, $\Psi$, (e.g., an azimuthal range) the sickle-shaped magnet arrangement may be configured to have a minimum radial width (e.g., of 1 mm).

As further shown in FIG. 6, at a sickle intersection, where sickle-shaped portions (e.g., sickle-shaped magnets) of the sickle-shaped magnet arrangement of FIG. 6 meet, the sickle-shaped magnet arrangement may be configured to have a minimum radial width. In some implementations, the sickle intersection is configured to be substantially centered at azimuthal coordinates within the azimuthal ranges where the sickle-shaped magnet arrangement is configured to have a minimum radial width.

Figure 1B:
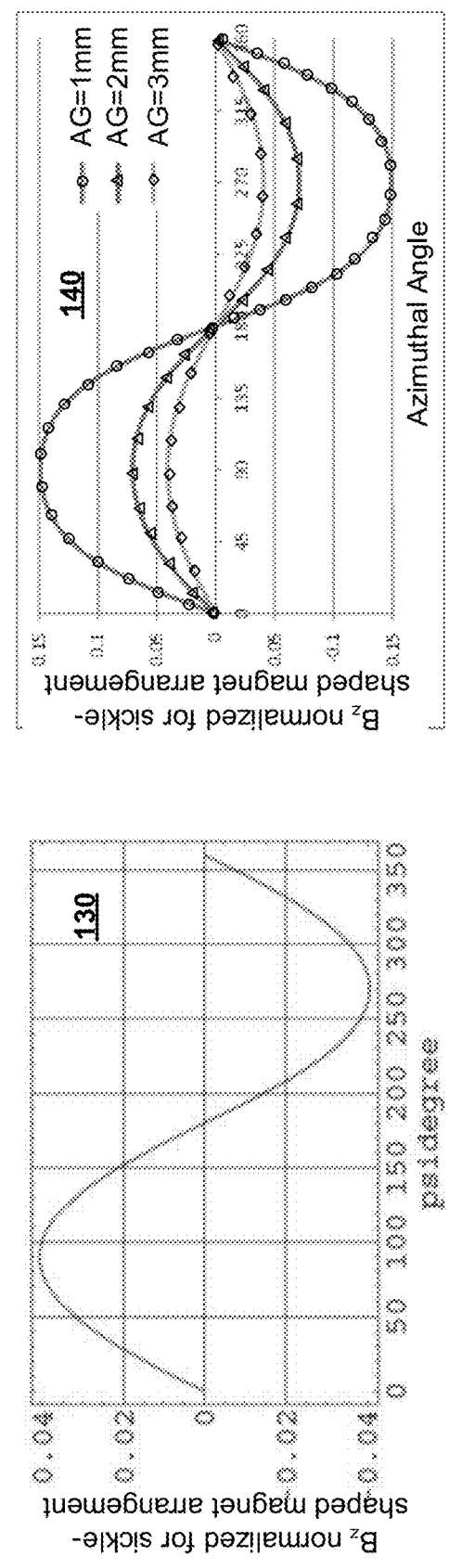

Furthermore, as shown in example implementation 600 of FIG. 6, an axial thickness of a sickle-shaped magnet arrangement may be decreased at parts of the sickle-shaped magnet arrangement that have a minimum radial width. In some implementations, decreasing the axial thickness at parts of the sickle-shaped magnet arrangement that have a minimum radial width may cause a magnetic field of the sickle-shaped magnet arrangement of example implementation 600 to be relatively similar to a sickle-shaped magnet arrangement with an infinitely thin radial width (e.g., such as the sickle-shaped magnet arrangement of FIG. 1) without compromising the structural integrity of the sickle-shaped magnet arrangement. In some implementations, the axial thickness of the sickle-shaped magnet arrangement may be configured to gradually decrease the closer the azimuthal coordinate is to the sickle intersection. The axial thickness may be exponentially decreased, linearly decreased, and/or decreased in any other like manner.

Accordingly, example implementation 600 provides a sickle-shaped magnet arrangement that may generate a pure, or near pure, sine wave according to examples described herein and maintain structural integrity of the sickle-shaped magnet arrangement at parts of the sickle-shaped magnet arrangement having relatively thin radial widths.

As indicated above, FIG. 6 is provided merely as an example. Other examples are possible and may differ from what was described with regard to FIG. 6.

According to some implementations described herein, a sickle-shaped magnet arrangement is configured for a rotational angle detection system. The sickle-shaped magnet arrangement may be configured to generate a magnetic field that is capable of being measured in a relatively pure sine wave. The relatively pure sine wave enables magnetic sensors to detect a rotational angle within 1°. Accordingly, the sickle-shaped magnet arrangement provides increased accuracy in determining the rotational angle over prior magnet arrangements.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Some implementations are described herein to include a "parallel" relationship or a "perpendicular" relationship. As used herein, "parallel" is meant to cover "substantially parallel" and "perpendicular" is meant to cover "substantially perpendicular." Further, as used herein, "substantially" refers to a described measurement, element, or relationship being within a tolerance (e.g., a design tolerance, a manufacturing tolerance, an industry standard tolerance, and/or the like).

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A sickle-shaped magnet arrangement for use in determining a rotational angle of a rotatable object, the sickle-shaped magnet arrangement configured to co-rotate with the rotatable object around a rotational axis, the sickle-shaped magnet arrangement comprising:
   an inner circumferential surface having an inner radius that is based on an azimuthal coordinate of the sickle-shaped magnet arrangement;
   an outer circumferential surface having an outer radius that is based on the azimuthal coordinate of the sickle-shaped magnet arrangement,
      wherein at least the inner radius or the outer radius varies based on the azimuthal coordinate; and
   an axial thickness between a first end of the sickle-shaped magnet arrangement and a second end of the sickle-shaped magnet arrangement,
      wherein the inner circumferential surface and the outer circumferential surface form a first sickle-shaped portion and a second sickle-shaped portion,
         wherein the first sickle-shaped portion is diametrically opposite the second sickle-shaped portion, and
         wherein the first sickle-shaped portion is magnetized in a first direction and the second sickle-shaped portion is magnetized in a second direction that is within a threshold angle of the first direction and different from the first direction.

2. The sickle-shaped magnet arrangement of claim 1, wherein to the outer radius is larger than a radius of a reading circle of magnetic sensors associated with the sickle-shaped magnet arrangement and the inner radius is smaller than the radius of the reading circle.

3. The sickle-shaped magnet arrangement of claim 1, wherein the first sickle-shaped portion and the second sickle-shaped portion are diametrically symmetrical.

4. The sickle-shaped magnet arrangement of claim 1, wherein the first sickle-shaped portion comprises a first sickle-shaped magnet and the second sickle-shaped portion comprises a second sickle-shaped magnet.

5. The sickle-shaped magnet arrangement of claim 1, wherein the first sickle-shaped portion and the second sickle-shaped portion intersect at locations where a radial width of the first sickle-shaped portion and a radial width of the second sickle-shaped portion are smallest.

6. The sickle-shaped magnet arrangement of claim 1, wherein the axial thickness of the first sickle-shaped portion is based on a thickness of a radial width of the sickle-shaped magnet arrangement,
   wherein the radial width is based on the azimuthal coordinate and comprises a difference between the inner radius and the outer radius at the azimuthal coordinate of the sickle-shaped magnet arrangement.

7. The sickle-shaped magnet arrangement of claim 1, wherein
   the inner circumferential surface comprises an elliptic cylindrical inner circumferential surface and the outer circumferential surface comprises an elliptic cylindrical outer circumferential surface.

8. The sickle-shaped magnet arrangement of claim 7, wherein
   a major axis of the elliptic cylindrical inner circumferential surface is perpendicular to a minor axis of the elliptic cylindrical outer circumferential surface.

9. A rotational angle detection system comprising:
   a sickle-shaped magnet arrangement for use in determining a rotational angle of a rotatable object, the sickle-shaped magnet arrangement configured to co-rotate with the rotatable object around a rotational axis,
      wherein the sickle-shaped magnet arrangement includes:
         a first sickle-shaped portion magnetized in a first direction, and
         a second sickle-shaped portion magnetized in a second direction that is between 120° and 180° from the first direction,
            wherein the first sickle-shaped portion and the second sickle-shaped portion are formed by an inner circumferential surface and an outer circumferential surface of the sickle-shaped magnet arrangement; and
   a magnetic sensor to measure the rotational angle of the rotatable object based on a magnetic field formed from the first sickle-shaped portion and the second sickle-shaped portion of the sickle-shaped magnet arrangement;
      wherein the magnetic sensor is positioned within a reading circle,
         wherein the reading circle has a reading radius corresponding to a distance between a position of the magnetic sensor and the rotational axis, and
      wherein an inner radius, that is smaller than the reading radius, of the inner circumferential surface is based on an azimuthal coordinate of the sickle-shaped magnet arrangement, and
      wherein an outer radius, that is larger than the reading radius, of the outer circumferential surface varies based on the azimuthal coordinate of the sickle-shaped magnet arrangement and the reading radius.

10. The rotational angle detection system of claim 9, wherein the sickle-shaped magnet arrangement is connected to or formed as part of a swashplate,
   wherein the swashplate is connected to or formed as part of the rotatable object to cause the sickle-shaped magnet arrangement to co-rotate with a rotatable shaft around the rotational axis.

11. The rotational angle detection system of claim 9, wherein the magnetic sensor is one of a plurality of magnetic sensors,
   wherein the plurality of magnetic sensors are positioned on the reading circle.

12. The rotational angle detection system of claim 9, wherein the first sickle-shaped portion and the second sickle-shaped portion are diametrically symmetrical.

13. The rotational angle detection system of claim 9, wherein an axial thickness of the first sickle-shaped portion is based on a thickness of a radial width of the sickle-shaped magnet arrangement,
   wherein the radial width is based on the azimuthal coordinate and comprises a difference between the inner radius and the outer radius at the azimuthal coordinate of the sickle-shaped magnet arrangement, and wherein the axial thickness is thickest where the radial width is thickest and thinnest where the radial width is thinnest.

14. The rotational angle detection system of claim 9, wherein an axial thickness of the first sickle-shaped portion is based on a thickness of a radial width of the sickle-shaped magnet arrangement,
wherein the radial width varies monotonously between a smallest radial width and a largest radial width and the axial thickness correspondingly varies monotonously between a smallest axial thickness and a largest axial thickness.

15. The rotational angle detection system of claim 9, wherein the sickle-shaped magnet arrangement is one of a plurality of sickle-shaped magnet arrangements of the rotational angle detection system,
wherein the plurality of sickle-shaped magnet arrangements are connected to or formed as part of a same swashplate,
wherein the swashplate is connected to or formed as part of the rotatable object to cause the plurality of sickle-shaped magnet arrangements to co-rotate with the rotatable object around the rotational axis.

16. A magnet arrangement for use in determining a rotational angle of a rotatable object, the magnet arrangement comprising:
a first magnet configured to co-rotate with a rotatable shaft around a rotational axis, the first magnet including:
a first inner circumferential surface having a first inner radius that varies based on an azimuthal coordinate of the magnet arrangement;
a first outer circumferential surface having a first outer radius that varies based on the azimuthal coordinate of the magnet arrangement; and
a first axial thickness between a first end of the magnet arrangement and a second end of the magnet arrangement,
wherein the first inner circumferential surface and the first outer circumferential surface form a first sickle-shaped portion and a second sickle-shaped portion,
wherein the first sickle-shaped portion is diametrically opposite the second sickle-shaped portion,
wherein the first sickle-shaped portion is magnetized in a first direction and the second sickle-shaped portion is magnetized in a second direction that is within a threshold angle of the first direction and different from the first direction, and
wherein a thickness of the first axial thickness is based on the azimuthal coordinate of the magnet arrangement and is proportional to a radial width of the magnet arrangement at the azimuthal coordinate,
wherein the radial width at the azimuthal coordinate corresponds to a difference between a radius of an inner circumference at the azimuthal coordinate and a radius of an outer circumferential surface at the azimuthal coordinate.

17. The magnet arrangement of claim 16,
wherein the magnet arrangement further comprises:
a second magnet configured to co-rotate with the rotatable object around the rotational axis, the second magnet including:
a second inner circumferential surface having a second inner radius that is based on the azimuthal coordinate of the magnet arrangement and a distance between the rotational axis and a center radius of the magnet arrangement, and
a second outer circumferential surface having a second outer radius that is based on the azimuthal coordinate of the magnet arrangement, and
a second axial thickness between the first end of the magnet arrangement and the second end of the magnet arrangement,
wherein the second inner circumferential surface and the second outer circumferential surface form a third sickle-shaped portion and a fourth sickle-shaped portion, and
wherein the third sickle-shaped portion is diametrically opposite the fourth sickle-shaped portion,
wherein the third sickle-shaped portion is magnetized in the first direction and the fourth sickle-shaped portion is magnetized in the second direction.

18. The magnet arrangement of claim 17, wherein
the first magnet and the second magnet are connected to or formed as part of a swashplate, and
the swashplate is connected to or formed as part of the rotatable object to cause the magnet arrangement to co-rotate with the rotatable object around the rotational axis.

19. The magnet arrangement of claim 17, wherein
the first sickle-shaped portion is aligned adjacent the third sickle-shaped portion such that a thickest radial width of the first sickle-shaped portion is aligned with a thickest radial width of the third sickle-shaped portion, and
the second sickle-shaped portion is aligned adjacent a fourth sickle such that a thickest radial width of the third sickle-shaped portion such that a thickest radial width of the second sickle-shaped portion is aligned with a thickest radial width of the fourth sickle-shaped portion.

20. The magnet arrangement of claim 16, wherein
the first inner circumferential surface comprises an elliptic cylindrical inner circumferential surface and the first outer circumferential surface comprises an elliptic cylindrical outer circumferential surface, and
a major axis of the elliptic cylindrical inner circumferential surface is perpendicular to a minor axis of the elliptic cylindrical outer circumferential surface.

* * * * *